United States Patent [19]

Davis et al.

[11] 4,207,397

[45] Jun. 10, 1980

[54] METHOD FOR RECOVERING AND TREATING BRINE FROM WATER SOFTENER REGENERATION

[75] Inventors: Stephen H. Davis, Dayton, Ohio; James E. Etzel, Lafayette, Ind.

[73] Assignee: Water Refining Company, Inc., Middletown, Ohio

[21] Appl. No.: 942,540

[22] Filed: Sep. 15, 1978

[51] Int. Cl.² .............................................. B01D 15/06
[52] U.S. Cl. ....................................... 521/26; 210/34; 210/38 A
[58] Field of Search .................... 210/28, 30 R, 34, 35, 210/38 A, 49, 52, 53, 190, 191, 265, 269, 275, 276, 295; 521/26

[56] References Cited

U.S. PATENT DOCUMENTS

| | | |
|---|---|---|
| 3,101,316 | 8/1963 | Rose ........................................ 210/35 |
| 3,350,292 | 10/1967 | Weinberger et al. ............... 210/38 A |
| 3,528,912 | 9/1970 | Popper et al. .......................... 210/28 |
| 3,977,968 | 8/1976 | Odland ............................... 210/38 A |

Primary Examiner—Ivars C. Cintins
Attorney, Agent, or Firm—Biebel, French & Nauman

[57] ABSTRACT

Cation exchange water softeners may be regenerated and, then, the regenerant wastes (brine) recovered, treated, and recycled. The result is a closed system which is ecologically beneficial. The regenerant brine is captured in as concentrated a form as possible and then treated with a precipitant such as sodium or potassium carbonate or mixtures of sodium or potassium carbonate with sodium or potassium hydroxide. Calcium and magnesium compounds are precipitated and the supernatant contains sodium or potassium chloride. These are separated within the brine treatment tank, the precipitate being disposed of as a sludge or sludge cake and the supernatant being recycled to the water softener at the time of further regeneration.

4 Claims, 2 Drawing Figures

METHOD FOR RECOVERING AND TREATING BRINE FROM WATER SOFTENER REGENERATION

BACKGROUND OF THE INVENTION

The present invention relates to a method for recovering and treating the brine from water softener regeneration, and more particularly, to a closed system for regenerating cation exchange water softeners with potassium chloride or sodium chloride and, then, softening the regenerant wastes (brine) produced during the regeneration.

Traditionally, cation exchange water softeners are regenerated with a sodium chloride (NaCl) regenerating material. An excess of NaCl is used. The sodium ions replace the magnesium and calcium ions trapped on the ion exchange resin. Calcium chloride and magnesium chloride are produced. Those chlorides, along with the excess NaCl, are dumped into the sewers and eventually find their way into the nation's rivers, streams and lakes.

This creates an ecologically undesirable result. Since all of these materials in the regenerant wastes are soluble, their discharge into a water course adds significantly to the total dissolved solids which must be handled by a downstream user of the water course when he attempts to treat the water to make it suitable for domestic or industrial consumption. For this reason, pollution control laws already enacted or about to be enacted may in the future prohibit discharge of high concentration soluble inorganic salts into waters. Accordingly, it becomes necessary to attempt to prevent such a discharge or regenerant brine from cation exchange water softeners.

For this reason, Popper in U.S. Pat. No. 3,528,912 discloses a process for treating regenerate brine with sodium carbonate to precipitate calcium and magnesium carbonate. Regenerate liquor is flowed through an ion-exchange column in an upflow mode, captured, and treated with the sodium carbonate prior to being filtered. The filtrate is replenished with sodium ions and recycled back to the ion-exchange column to effect further regeneration. At Col. 3, lines 52–67, it is explained that problems may occur with the precipitate if it becomes gelatinous. Popper handles these problems by use of a special filtering technique.

Odland U.S. Pat. No. 3,977,968, however, indicates that a more desirable solution is to dilute the regenerate brine so that the alkaline earth metal content is less than 16,000 ppm, calculated as calcium carbonate. Odland states that only in this way it is truly possible to avoid formation of a gelatinous precipitate and make the process workable.

Still, by diluting the regenerate brine in this manner, difficulties are encountered in producing a workable closed system. That is, in a closed system, it is imparative from a processing and equipment standpoint that the treatment chemicals be as concentrated as possible. This means that the volume of sludge generated must be equal to or greater than the displacement volume of the chemicals added for brine treatment. Should the volume of the treatment chemicals be greater than the volume lost from the sludge, cyclic operation will give an even increasing dilution or volume of regenerate, which ultimately causes failure of the system. In turn, dilution of the regenerant brine merely aggravates the problem.

Accordingly, the need exists for an effective and efficient means for recovering and treating the brine from the regeneration cycle of cation exchange water softeners. More importantly, a need exists for a workable closed system for regenerating cation exchange water softeners, and then, recovering and treating the brine in an ecologically beneficial manner.

SUMMARY OF THE INVENTION

The present invention satisfies those needs by providing a method for regenerating a cation exchange water softener followed by efficient recovery and effective treatment of the brine from the water softener regeneration as a closed system. The regenerating material used is potassium chloride or sodium chloride. The brine produced during the regeneration, therefore, will contain calcium chloride and magnesium chloride as well as any unused potassium chloride or sodium chloride.

The major portion of the brine is recovered in as concentrated a form as possible. This is done by draining the water softener prior to regeneration and adding a finite volume of regenerating material to the evacuated bed. The volume used should be sufficient to reach a level of approximately 50% of bed depth over the resin. The regenerant brine is then withdrawn from the water softener with no additional dilution. This eliminates the need for water displacement of the brine as is the typical practice when brine is forced from the cation exchange column by flowing water therethrough. This brine handling scheme is critical to the cyclic operation of the system since any dilution with water requires additional and costly treatment steps to keep the system operating in a closed mode.

In the subsequent treatment step, the brine is admixed in a brine treatment tank with a precipitate in the form of sodium carbonate, potassium carbonate, a mixture of potassium carbonate and potassium hydroxide, or a mixture of sodium carbonate and sodium hydroxide. Treatment of brine solutions with such chemicals or mixture of chemicals is known. See, for example, U.S. Pat. Nos. 2,628,165; 3,350,294; 3,528,912; and 3,977,968. As disclosed in these patents, the possible reactions involved are:

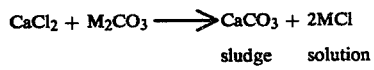

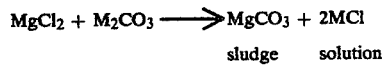

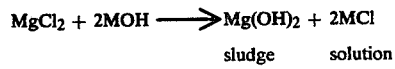

wherein M is either potassium (k) or sodium (Na).

The precipitate is then separated from the supernatant. This may simply be done by using a reaction chamber within the brine treatment tank or a separate sludge storage tank, from which clean supernatant is decanted after the precipitate has settled. The precipitate may be disposed of as a sludge or sludge cake. As a modification, a filter, such as a sand filter or a vacuum filter may be used. A polyelectrolyte may be added prior to separation to aid in consolidation of the precipitate.

The filtrate is supplemented with additional potassium chloride or sodium chloride and recycled back into the cation exchange column at the time of further regeneration. A bed of potassium chloride or sodium chloride crystals may be used in the regenerating material storage area (either within or without the brine treatment tank) as a source of the additional regenerating material. The supernatant is brought into contact with the resaturating chemical prior to introduction into the cation exchange column during the next regeneration cycle.

In this manner, a closed system is provided which is ecologically advantageous when compared to present day water softener regenerating systems. As is apparent, by precipitating the magnesium and calcium ions in the brine and reuse of the chloride ions in the form of potassium or sodium chloride, there is eliminated substantial dumping of chloride wastes into the sewers. The net discharge to the environment is essentially nothing more than the salts that were originally in the water prior to treatment. Likewise, the calcium carbonate and magnesium carbonate or hydroxide containing sludge may be disposed of in an ecological manner as a land-fillable substance or otherwise as a soil conditioning agent.

Accordingly, it is an object of the present invention to provide a method for regenerating cation exchange water softeners and treating the brine recovered therefrom, all as an essentially closed system.

Other objects and advantages of the invention will be apparent from the following description, the accompanying drawing and the appended claims.

DESCRIPTION OF THE PREFERRED EMBODIMENTS

Figure 1:
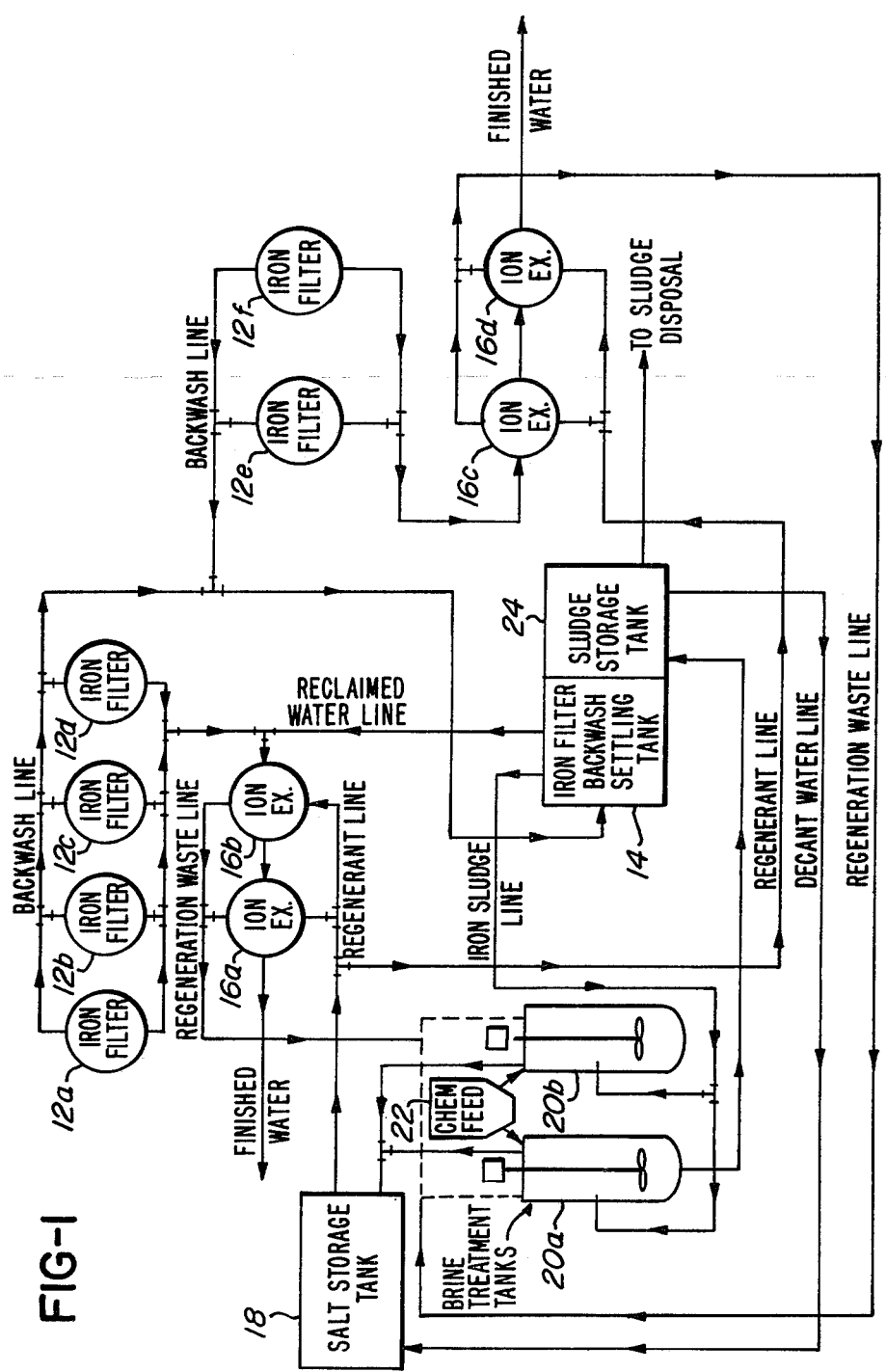
FIG. 1 is a schematic diagram of a system for utilizing the method of the present invention on a large scale.

Referring to FIG. 1, there is shown a schematic layout for an industrial-scale or water treatment plant operation. In the one shown, the treated waters are high in iron content and it is therefore necessary in the closed system to provide for removal of the iron in addition to the brine treatment of the present invention.

Thus, iron filters 12(a)–(f) are shown for that purpose. The treated water exiting from iron filters 12(a)–(f) is directed, then, to the ion exchange columns which are central to the system of the instant invention. As shown, reclaimed water from iron filter backwash settling tank 14 may also be directed to the ion exchange columns.

Ion exchange columns 16(a)–(d) are shown, although obviously fewer or more could be used depending on the size of the installation needed to soften the amount of water to be treated. Each may be any of the numerous cation exchange units available for water softening. A typical one will contain a bed of ion exchange resin positioned within a cylindrical column. An inlet hard water line is provided, as is an outlet soft water line.

As is customary, after a given amount of water has been softened, the resin bed must be regenerated. Sodium chloride (salt) is the usual regenerating material and is preferred here. But, of course, potassium chloride may be also used in the alternative. Ion exchange columns 16(a)–(d) are first backwashed with the wastewater going to iron filter backwash settling tank 14. The ion exchange column is then evacuated of any remaining liquid. Regenerating material is drawn from salt storage tank 18. The regenerant amount utilized is sufficient to fill the cation exchange column to a level so that it covers the resin bed completely and rises approximately an additional 50% of the resin bed depth over the resin, i.e., the regenerant is introduced to a level of approximately 150% or greater of the bed depth. It may be introduced into the ion-exchange column either by up flow or down flow.

The amount of regenerating material used is an important aspect of the present invention since it is an object of this invention to keep the brine to be treated in a concentrated form. It has been discovered that by using a volume of regenerating material which is sufficient only to cover the resin bed by an additional 50% an acceptable capacity for water treatment is achieved and yet the volume of brine to be later treated is a manageable amount.

Following regeneration, the brine is evacuated from the ion exchange column without significant dilution. This may be done by pumping the concentrated brine directly into brine treatment tanks 20(a) and 20(b). After a preset amount of concentrated brine is collected in a brine treatment tank, an appropriate amount of chemical precipitant is added from chemical feed 22. When the sodium form of regenerant is used, the preferred precipitant is sodium carbonate. It may also be a mixture of sodium carbonate and sodium hydroxide, if desired. When the potassium form is used, it may be potassium carbonate or a mixture of potassium carbonate and potassium hydroxide.

Since the brine to be treated contains calcium chloride and magnesium chloride, upon addition of sodium carbonate as a precipitant, calcium carbonate and magnesium carbonate precipitates begin to form. A stirrer may be used in brine treatment tanks 20(a) and (b) to give uniform mixing and promote precipitate formation. After a certain period of mixing, the stirrer is stopped and the tank contents allowed to settle.

The supernatant which forms may be decanted and returned to salt storage tank 18. It will contain dissolved sodium chloride because of the reaction mechanism set forth previously. It is then used as a supply of regenerant material for future regenerations.

The partially settled remainder of the treated brine is then conveyed to sludge storage tank 24. This may be one by using the low solids content iron sludge from iron filter backwash settling tank 14 as a wash and transfer water to convey the brine softening sludge to sludge storage tank 24. Of course, other means may be used to do so, and it is simply convenient to use the iron sludge for that purpose in the system layed out in FIG. 1.

In sludge storage tank 24, additional settling takes place. A polyelectrolyte may be added at appropriate times to aid in that settling and form a more compact sludge cake. Likewise, filtration may be used to dewater the sludge. Contrary to the experience of Popper in U.S. Pat. No. 3,528,912 and Odland in U.S. Pat. No. 3,977,968, problems have not been encountered with the sludge being too gelatinous to handle in this manner. Rather, settling and decanting alone have for the most part been sufficient to permit adequate separation.

Again, the supernatant is conveyed to salt storage tank 18 for reuse as a regenerating material. The sludge is, then, disposed of in an ecologically sound manner. Because the contents of the sludge are generally not detrimental to the environment, the sludge cake may be used as a land fill or as a soil conditioner.

In this way, an essentially closed system is provided for softening water and regenerating the ion exchange columns without the discharge of harmful pollutants into the nation's streams and waterways. This is particularly important for large scale water softening operations such as industrial or municipal treatment facilities. Of course, the process and apparatus of the present invention can also be used on a home or industrial scale water softening unit as well.

Figure 2:
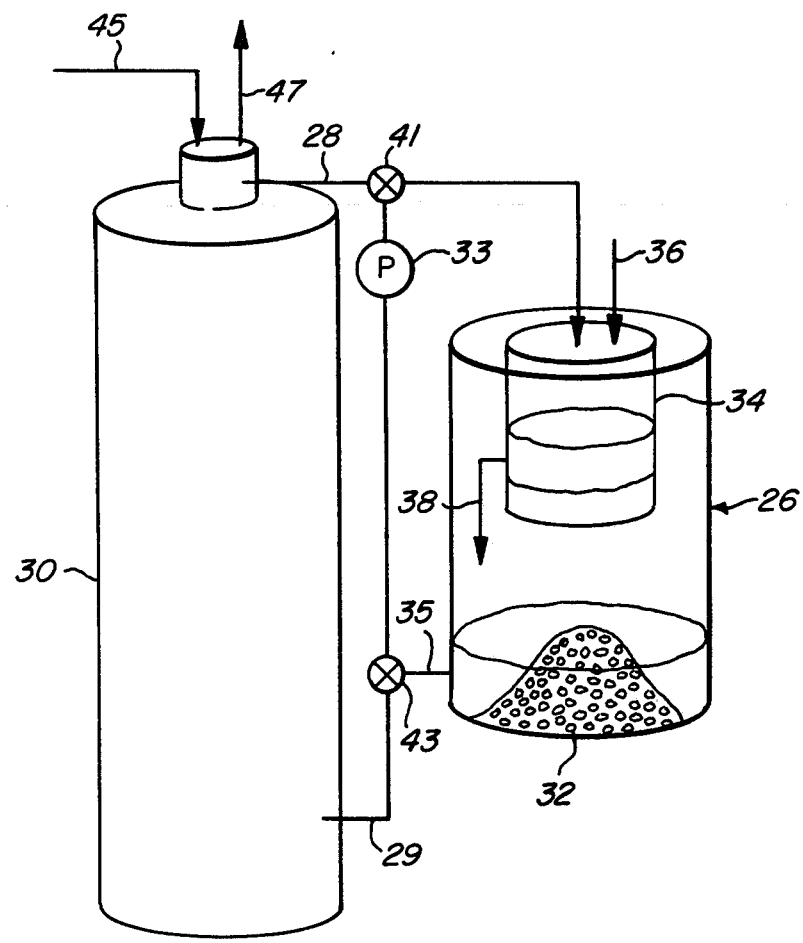
FIG. 2 is a schematic diagram of the apparatus of a modified embodiment, depicting the cation exchange column and the brine treatment tank involved in a smaller scale system.

FIG. 2 is illustrative of a modified form of the system which is applicable to home use.

In this embodiment, the means for subsequent treatment of the regenerant wastes is principally brine treatment tank 26 connected to water softener 30 having a hard water inlet 45 and soft water outlet 47. Either of inlets/outlets 28 or 29 from water softener 30 are used to withdraw the brine for transfer to brine treatment tank 26. The brine withdrawn is that formed during a regenerating cycle.

Again, the procedure for recovering the regenerant waste is important since the volume of the recovered brine should be kept as nearly constant as possible in order to efficiently operate on a continuous cycle basis. The recovered brine should also be as concentrated as possible so that the major portion of the brine from the regenerating cycle is recovered in the desired volume to be treated.

For this reason, the regenerating material used is as mentioned sufficient to cover approximately 150% or greater of the bed depth. After water softener 30 is evacuated, the regenerating material is introduced using pump 33 either by upflow through inlet/outlet 29 or downwardly through inlet/outlet 28. Valves 41 and 43 are used to control this. The column is then completely evacuated through either of inlet/outlets 28 or 29 into brine treatment tank 26, again using pump 33 (or gravity) and valves 41 and 43.

A source of regenerating material is the bed of sodium or potassium chloride crystals 32 located in the bottom of brine treatment tank 26. Line 35 is connected to brine treatment tank 26 for transferring an appropriately controlled (controls not shown) amount of regenerating material in solution form from brine treatment tank 26. Once the closed system of the present invention has been initiated, regenerating material is for the most part produced by the brine treatment process itself.

Upon recovery of the brine and transfer to the brine treatment tank 26, the brine is introduced into a separation unit 34. The separation unit shown is essentially a reaction chamber having an approximately five-gallon capacity. Through inlet 36 the precipitant is introduced. The treating chemicals are mixed thoroughly with the brine by the turbulence caused on introduction of the reactants or by use of a spiral raceway or other means of creating turbulence for mixing (not shown).

Since an objective is to be able to treat as large a portion of the regenerant wastes (brine) as possible, the treatment chemicals should also be as concentrated as possible. Desirably, the volume of sludge removed is greater than or equal to the volume of treatment chemical added. A more dilute treatment chemical would not allow this condition and would thus decrease the volume of the regenerant wastes which may be recovered. The amounts of treatment chemicals needed vary depending on the amount of magnesium chloride and calcium chloride in the brine. This in turn depends on the initial hardness of the water softened. However, once determined for a particular water hardness, a fixed, predetermined amount of treatment chemicals may be used for each brine softening cycle.

As shown in FIG. 2, and as distinct from the system of FIG. 1, the reaction chamber may itself serve as the separation unit 34. Thus, in its simplest form, the separation unit 34 may comprise a reaction chamber in which the precipitate is allowed to settle after reaction. The clear supernatant formed is decanted from separation unit 34 via line 38. In another modified embodiment, the reaction chamber may be the upper portion of the unit and the bottom of the unit may be a filter. It may comprise a sand filter with a sand bed, gravel base, glass wool retainer, and gauze overlay. The sand bed may be pea gravel. Of course, other filter arrangements may also be used.

The filter would be used to separate the supernatant from the precipitate. Since the precipitates form and settle rapidly, often times a clear supernatant is formed which need not be passed through the sand filter but may simply be decanted off.

As mentioned, the supernatant (supernatant-filtrate), which already contains sodium chloride (in the preferred embodiment) as a result of the brine treatment, is further supplemented by means of the bed of sodium chloride crystals 32 to form a regenerating solution which is used for further regeneration of the water softener 30. Of course, when potassium chloride is used as the regenerating material, potassium chloride crystals will be used rather than sodium chloride ones.

In this manner, a totally closed-regenerating-brine softening system is provided. The sodium chloride of the supernatant from the separation unit 34 is reused. The magnesium and calcium ions in the brine from the cation exchange unit are precipitated in the same reaction. The precipitate collected may conveniently be disposed of as a sludge or filter cake.

While the method and apparatus of the present invention constitutes a preferred embodiment of the invention, it is to be understood that the invention is not limited to this precise method and apparatus, and that changes may be made therein without departing from the scope of the invention which is defined in the appended claims.

What is claimed is:

1. A closed-mode method for regenerating a water softener having a cation exchange resin bed located therein and for recovering and treating the regenerant brine from the water softener regeneration, comprising:
    (a) backwashing said cation exchange resin bed,
    (b) evacuating the liquid from said water softener,
    (c) introducing a saturated brine of regenerating material selected from the group consisting of potassium chloride and sodium chloride into said water softener to a level of approximately 150% or greater of said cation exchange resin bed depth to produce regenerant wastes in the form of a calcium chloride and magnesium chloride containing regenerant brine,
    (d) evacuating said regenerant brine from said resin bed and recovering a concentrated portion of said regenerant brine for further treatment,
    (e) treating said regenerant brine with a treatment chemical selected from the group consisting of sodium carbonate, potassium carbonate, a mixture of potassium carbonate and potassium hydroxide, and a mixture of sodium carbonate and sodium hydroxide to produce a calcium and magnesium containing precipitate and a potassium chloride or sodium chloride containing supernatant, (f) separating said precipitate from said supernatant, (g) resaturating said supernatant with additional potassium chloride or sodium chloride regenerating material, and (h) recycling said resaturated supernatant to said water softener at the time of further regeneration, whereby a closed system for water softening and water softener regenerating is achieved.

2. The method of claim 1 wherein said calcium and magnesium containing precipitate is separated from said potassium chloride or sodium chloride supernatant by decanting said supernatant from said precipitate as it settles within a separation unit.

3. The method of claim 2 wherein filtration is used to further dewater said precipitate.

4. The method of claim 1 wherein said regenerating material is sodium chloride and said treatment chemical is sodium carbonate which is added to said recovered regenerant brine, then, thoroughly blended with said regenerant brine to rapidly and effectively produce said calcium carbonate and magnesium carbonate precipitate.

* * * * *